United States Patent
Kim et al.

(10) Patent No.: US 6,445,746 B1
(45) Date of Patent: Sep. 3, 2002

(54) IS-136+ SLOT FORMATION

(75) Inventors: In-Kyung Kim, North Potomac; Wonjin Sung, Germantown, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/372,341

(22) Filed: Aug. 11, 1999

(51) Int. Cl.$^7$ ............................................... H04L 27/20

(52) U.S. Cl. ........................ 375/280; 375/283; 375/281; 370/215; 329/304

(58) Field of Search ................................. 375/279, 281, 375/280, 283, 295, 302, 308, 322, 324, 325, 329, 330, 362; 370/215, 321, 322, 324, 326, 329, 336, 337, 345, 347, 350, 442, 498, 503, 509, 510, 512, 520; 329/304, 306, 371

(56) References Cited

U.S. PATENT DOCUMENTS

| | | | | |
|---|---|---|---|---|
| 5,553,098 A | * | 9/1996 | Cochran et al. | 164/238 |
| 5,987,019 A | * | 11/1999 | Raith et al. | 370/337 |
| 6,081,514 A | * | 6/2000 | Raith | 370/321 |
| 6,112,084 A | * | 8/2000 | Sicher et al. | 370/347 |
| 6,304,559 B1 | * | 10/2001 | Jacklin et al. | 370/310 |

OTHER PUBLICATIONS

Zoran Kostic & Naeem A. Abbasi,"Effects of Transmitter, Receiver and Channel Impairments on the Performance of the Enhanced IS–136 Digital Cellular System for Transmission of High–Quality Speech", Vehicular Technology Conference, 1997,IEEE 47th,vol:1, 1997,p441–445 vol. 1.*

Zoran Kostic and Naeem A. Abbasi, "Experimental Performance Results of an Indoor Wireless Extension of IS–136 based on pi/8 D8PSK, Coded Modulation, and Antenna Diversity", Vehicular Technology Conference, 1998, VTC 98th.48th IEEE, V.2, 1998,p1069–1074 vol.2.*

"TDMA Cellular/PCS—Radio Interface—Mobile Station—Base Station Compatibility—Traffic Channels and FSK Control Channel" TIA/EIA Interim Standard, Telecommunications Industry Association, Oct. 5, 1996, pp. 11–15.

* cited by examiner

Primary Examiner—Chi Pham
Assistant Examiner—Khanh Cong Tran
(74) Attorney, Agent, or Firm—John T. Whelan; Michael W. Sales

(57) ABSTRACT

A system and method for demodulating slots having a mixed slot formation including differential and coherently encoded slots is disclosed. The method includes pre-phase encoding data and a predetermined sequence in a slot at a transmitter such that the encoded data and the predetermined sequence have equal reference phases from a reference symbol of a previous slot having a reference phase. Another method includes pre-phase encoding the predetermined sequence with a phase determined from a reference symbol from the previous slot at the transmitter. Yet another method includes differentially phase encoding the predetermined sequence according to IS-136A standards using a reference phase of $$\frac{\pi}{4}.$$

In another method pre-phase encoding data includes phase shifting data using one of a group of different phase angles, each of the different phase angles an integer multiple of $$\frac{\pi}{2}.$$

Also, an IS-136 compatible receiver utilizing a 8-Phase Shifting-Key (8-PSK) slot structure for downlink communications, comprises a receiver for receiving a plurality of slots having a slot structure comprising: a SYNC sequence, data bits, and a plurality of reserved bits.

12 Claims, 4 Drawing Sheets

| SYNC | REF | PC | DATA | PLT | DATA | PLT | DATA | PLT | DATA | PLT | RAMP |
|---|---|---|---|---|---|---|---|---|---|---|---|
| 14 SYM | 1 SYM | 1 BIT | 101 BITS | 9 BITS | 99 BITS | 9 BITS | 99 BITS | 9 BITS | 99 BITS | 9 BITS | 6 BITS |

ALL THE BITS BELOW ARE REFFERED TO AS "DATA FIELD".

SYMBOL = 3 BITS     IS-136+ DOWNLINK SLOT FORMAT ACCEPTED BY TIA UNTIL APRIL 1998

*Fig. 2*

| SYNC | RSVD | PC | DATA | PLT | DATA | PLT | DATA | PLT | DATA | PLT | RAMP |
|---|---|---|---|---|---|---|---|---|---|---|---|
| 14 SYM | 2 BITS | 1 BIT | 101 BITS | 9 BITS | 99 BITS | 9 BITS | 99 BITS | 9 BITS | 99 BITS | 9 BITS | 6 BITS |

NEW DATA FIELD ( NO REF SYMBOL )

SYMBOL = 3 BITS     IMPROVED IS-1346+ DOWNLINK SLOT FORMAT (ADOPTED JUNE 1998 BY TIA)

*Fig. 3*

TRANSMITTER MODULATOR

IS-136+ SLOT FORMATION

BACKGROUND OF THE INVENTION

The present invention relates to demodulation and channel estimation in a wireless communication system, and more particularly, to systems using mixed slot formats. Even more particularly, the present invention relates to demodulation systems using both coherent eight (8) Phase-Shift-Keying (8-PSK) modulation schemes, as well as Differential-Quadrature-Phase-Shift Keying (DQPSK) modulation schemes, wherein a new slot format is defined which frees up bits priorly used for a reference symbol.

Prior IS-136+ standards supporting modulation formats used both a standard SYNC pattern as defined in IS-136 Rev. A, as well as a standard reference (REF) symbol, or reference symbol directly following the SYNC pattern in the slot format. Due to backward compatibility issues, IS-136+ slot is required to have exactly the same SYNC pattern as IS-136A slot, i.e., SYNC pattern symbols need to be differentially modulated (DQPSK) while other data are coherently modulated (8-PSK). Therefore, it was originally considered necessary to insert the reference symbol (REF) between this SYNC pattern and a data field in order to resolve phase reference inconsistencies since a random phase shift from the SYNC pattern is an unknown quantity to the receiver. The REF pattern was checked against the SYNC pattern for any phase differences and was used to demodulate a coherent 8-PSK-modulated IS-136+ slot. This is the basis for the slot format used in the IS-136+ down link slot format accepted by the Telecommunications Industry Association (TIA) in April 1998.

The IS-136 Rev. A standard is an earlier standard than the April '98 IS-136+ standard and uses 2 bits per symbol instead of 3 bits per symbol respectively. Another difference between IS-136 Rev. A and the April '98 IS-136+ standards, is that the former uses Differential-Quadrature-Phase-Shift-Keying (DQPSK), which allows for only 2 bits per symbol as opposed to the eight (8) Phase-Shift-Keying (8-PSK) modulation scheme (IS-136+ standard) using 3 bits per symbol. In the 8-PSK scheme, eight (8) modulation values are possible using a 3 bit symbol instead of only four (4) modulation values available from the 2 bit symbol of the former IS-136 Rev. A standard.

In a typical slot format using IS-136-TDMA North American Standard (NAS), a 40 millisecond frame, has six (6) slots of 6.67 milliseconds each slot, and 162 symbols comprising a SYNC pattern, pilot data (fixed symbols used for channel condition estimation) and data.

An inherent problem in utilizing the SYNC symbols plus REF symbol to do demodulation and channel condition estimation, is that, data bandwidth utilized by the REF symbol cannot be used for transmitting data bits or link control information in the data field of the slot format. Another problem is that demodulation with the current scheme depends on correctly decoding the REF symbol so as not to corrupt data in other data fields. An entire burst can be lost due to a single symbol error when depending upon the REF symbol to correctly demodulate the rest of the slot. Therefore, eliminating the need for the REF symbol and improves overall receiver performance as well as system performance. Once the REF symbol is removed, the freed-up 3 bits (or symbol) can be reserved for any purpose.

To achieve necessary backward compatibility between IS-136 Rev. A and IS-136+ mobiles the SYNC pattern needs to be differentially encoded in each case. This causes a random phase shift depending on the last symbol phase of the previous slot. Therefore, since the SYNC pattern (symbols) does not use a fixed phase reference for transmission and the rest of the data fields use a fixed referenced phase, a reference inconsistency exists due to the random phase shift of the SYNC being unknown at the receiver. Backward compatibility therefore requires finding a way to determine or compensate for this unknown random phase shift of the SYNC at the receiver.

The present invention advantageously addresses the above and other needs.

SUMMARY OF THE INVENTION

The present invention advantageously addresses the needs above as well as other needs by providing an apparatus and method of performing demodulation for transmitted data in a slot format which compensates for an unknown random phase shift of a SYNC pattern at a receiver other than by relying upon a standard reference (REF) symbol. Compensation occurs by essentially pre-rotating phases of all symbols to be transmitted at the transmitter such that all the symbols have equal reference phases. This is possible since a receiver cannot distinguish sources of phase shifts on a received signal.

A method of demodulation in a system for a mixed slot formation including differential and coherently encoded slots includes: pre-phase encoding data and a predetermined sequence in a slot at a transmitter such that the encoded data and the predetermined sequence have equal reference phases from a reference symbol of a previous slot.

In a variation, the method further includes: pre-phase encoding the predetermined sequence with a phase determined from a reference symbol from the previous slot at the transmitter, if the previous is in IS-136A format.

For a variation wherein the previous slot is in IS-136+ format, the method further includes differentially phase encoding the predetermined sequence according to IS-136A standards using a reference phase of $$\frac{\pi}{4}.$$

In another variation, pre-phase encoding data includes phase shifting data using one of a group of different phase angles, each of the different phase angles an integer multiple of $$\frac{\pi}{2}.$$

In another embodiment, an IS-136 compatible receiver utilizing a 8-Phase Shifting-Key (8-PSK) slot structure for downlink communications comprises: a receiver for receiving a plurality of slots having a slot structure comprising: a SYNC sequence, data bits, and a plurality of reserved bits.

In a further variation of the receiver the plurality of reserved bits is a data field.

In yet another variation of the receiver the plurality of reserved bits is a link control field.

In another embodiment, an IS-136 compatible transmitter comprises: a differential encoder to differentially encode a SYNC pattern in a slot if a previous slot is in IS-136 Rev. A format; and a phase-mapping encoder to phase-shift data bits by an amount determined by mapping a previous reference symbol to a multiple of $$\frac{\pi}{2}.$$

A further embodiment comprises a transmitter having means for generating a plurality of slots with a slot format comprising: a SYNC sequence, data bits and reserved bits.

BRIEF DESCRIPTION OF THE DRAWINGS

The above and other aspects, features and advantages of the present invention will be more apparent from the following more particular descriptions thereof, presented in conjunction with the following drawings wherein:

FIG. 2 is an IS-136+ downlink slot format accepted by the Telecommunications Industry Association (TIA) until April 1998 as originally purposed by Erickson in a paper entitled "Slot Format for 8-PSK Voice" at the TIA, (contribution "TR45.3.5/98.04.06.10), and which may be utilized in the system of FIG. 1;

FIG. 3 illustrates a newly adopted IS-136+ downlink slot format of the present invention, wherein a REF symbol is reassigned to two (2) reserved bits (RSVD) and one (1) user data bit, which may be used in the system of FIG. 1;

Corresponding reference characters indicate corresponding components throughout several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
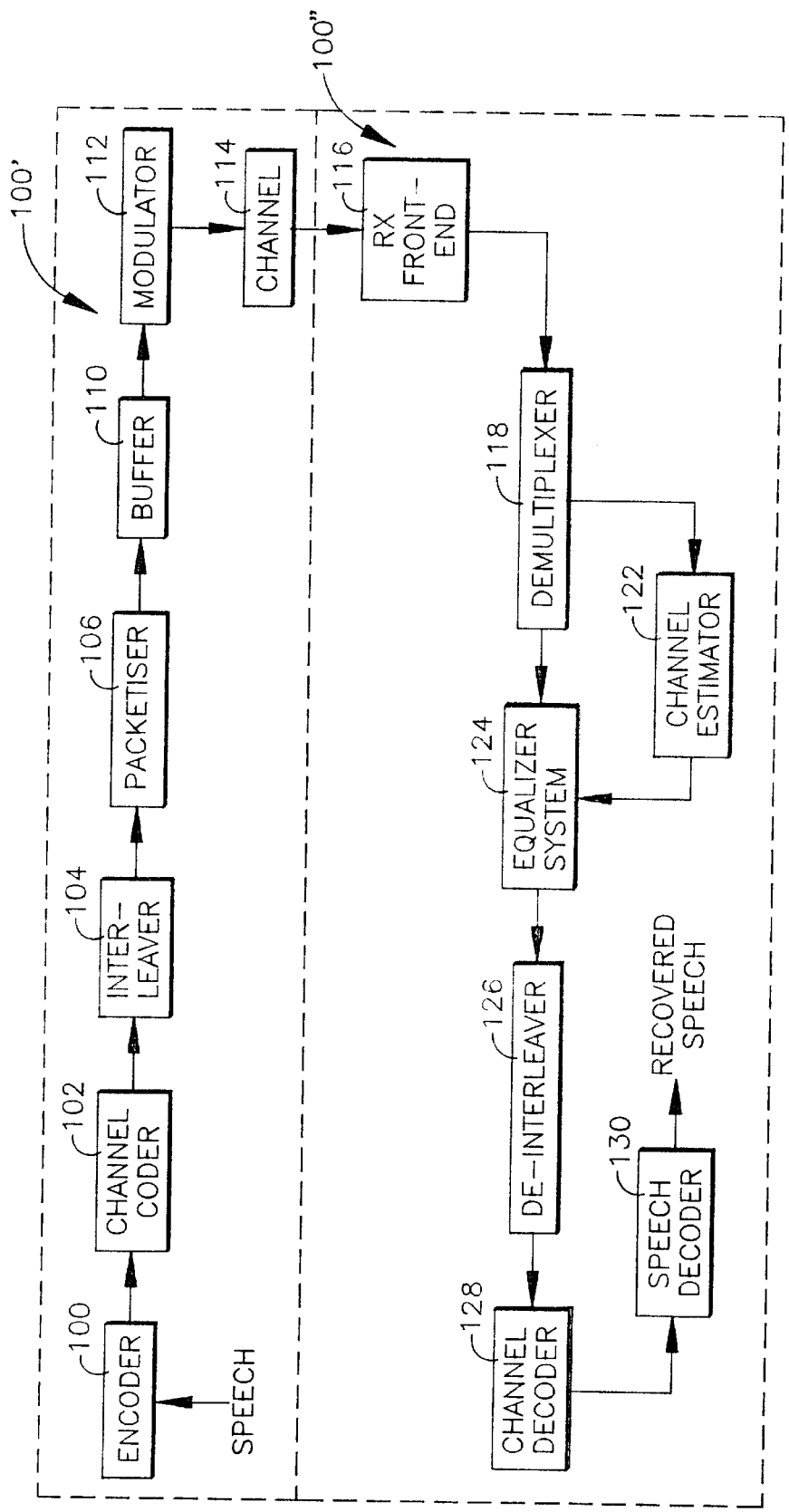
FIG. 1 is a block diagram of a generic TDMA mobile cellular communication system, wherein the present slot format may be utilized.

Referring first to FIG. 1, FIG. 1 illustrates a mobile cellular communications system, which transmits and receives IS-136 TDMA frames utilizing a mixed mode of slots. FIG. 1 shows a prior art Time Division Multiplier Access (TDMA) system which can be modified to include a transmitter and/or demodulator with a demodulation technique of the present invention.

FIG. 1 shows a transmitter 100' and receiver 100" system including: an Encoder 100; a Channel coder 102; an interleaver 104; a packetiser 106; a buffer 110; a modulator 112; a channel 114; a Receiver 116; a demultiplexer 118; a channel estimator 122; an equalizer system (or equalizer) 124; a de-interleaver 126; a channel decoder 128; and a speech decoder 130.

An output of the encoder 100 is coupled to an input of the channel coder 102. An output of the channel coder 102 is coupled to an input of the interleaver 104. An output of the interleaver 104 is coupled to a first input of the packetiser 106.

An output of the packetiser 106 is coupled to an input of the buffer 110 which has an output coupled to an input of the modulator 112. An output of the Modulator 112 is coupled to the channel 114. An input of the Receiver front-end 116 is coupled to the channel 114.

An output of the Receiver front-end 116 is coupled to an input of the demultiplexer (demux) 118, which is coupled at its output to both the equalizer 126 and the channel estimator 122. The channel estimator 122 is coupled to the equalizer system 124. An output of the equalizer system 124 is coupled to an input of the de-interleaver 126, an output of which is coupled to an input of the channel decoder 128. An output of the channel decoder 128 is coupled to an input of the speech decoder 130.

The system of FIG. 1 operates, in practice, as follows. The packetiser 106 receives digital speech which has been coded by encoder 100 and channel coder 102 and interleaved by interleaver 104, at a particular transmission rate. The packetiser 106 forms packets from data over a frame duration and releases it to the buffer 110 for transmission as a data burst to the modulator 112 which passes a modulated burst to the channel 114 for transmission to the front-end receiver 116. The receiver 116 demodulates an RF signal and demultiplexes a baseband signal at the multiplexer 118 to generate channel data.

Next equalization is performed at the equalizer system 124 with the aid of channel estimator 122 that obtains a measure of a complex baseband channel response. Next, de-interleaving is performed by the de-interleaver 126 that passes the de-interleaved channel data to the channel decoder 128 and the speech decoder 130 to finally recover speech.

Referring next to FIG. 2, FIG. 2 illustrates a prior art slot format (slot/s) 200 for an IS-136+ downlink standard already accepted by the Telecommunications Industry Association (TIA) until April 1998. The slot format (slot/s) 200 uses 3 bits per symbol corresponding to a coherent eight ( 8) Phase-Key-Shifting (8-PSK) modulation protocol, wherein there are six (6) different SYNC sequences in differential phase domain representing six (6) different slots 200 in a TDMA frame. The SYNC sequences (SYNC) 202 are differentially modulated in $$\frac{\pi}{4}$$

shifted DQPSK format per an IS+136 Rev. A standard.

The SYNC 202 comprises 14 symbols followed by a REF symbol (REF) 204, followed by a data field 206. Data field 206 comprises a PC bit 208, followed by a first data sequence 210 of 101 bits, followed by a first pilot sequence (PLT) 212 of 9 bits. Next in the data field 206 is a second data sequence 214 of 99 bits, followed by a second PLT sequence 216 (PLT) of another 9 bits. Next in the data field 206 is a third data sequence 218 of 99 bits. Following the third data sequence 218, is a third PLT sequence 220 of 9 bits and then a fourth data sequence 222 of 99 bits, followed by a fourth PLT sequence 224 of 9 bits and then a ramp sequence 226 of 6 bits.

As the SYNC 202 is differentially encoded, its modulated phase value depends on a phase of a last symbol of a previous slot, i.e., from a coherent 8-PSK modulation point-of-view, all the SYNC 202 symbols will have a random phase shift whose amount is determined by the phase of the last symbol of the previous slot.

However, the entire data field 206 is coherently modulated and not subjected to a random phase shift as is the SYNC 202. Therefore, the REF symbol (REF) 204 is traditionally used to figure out how much phase rotation is incurred on the SYNC 202 pattern at the transmitter 100', 400 so as to determine how much phase rotation is necessary for the data field 206 at the receiver 100".

However, if the data field 206 is pre-rotated at the transmitter 100', 400 before being transmitted such that it has the same phase reference as does the SYNC 22 symbol, there is no need to have the REF symbol 204 at all. This is a key feature of an embodiment of the invention.

Referring next to FIG. 3, FIG. 3 illustrates an embodiment of an improved slot format 300 of the present invention wherein the REF symbol of FIG. 2 is removed and reassigned to reserved (RSVD) data bits 304. The improved slot 300 comprises the SYNC sequence (SYNC) 302 of 14 symbols, followed by a new data field 306 having 3 added bits due to removal of the REF symbol 204 of FIG. 2. The remainder of the new data field 306 comprises analogous sequences as in FIG. 2.

The REF symbol 204 in FIG. 2 is split into two (2) reserved bits (RSVD) 304 and one (1) user data bit added to a Data sequence 310. Alternately the three (3) bits are all used as data bits in Data sequence 310, or any other Data sequence 314, 318, 322, or any other Pilot (PLT) sequence 312, 316, 320, or 324.

Figure 4:
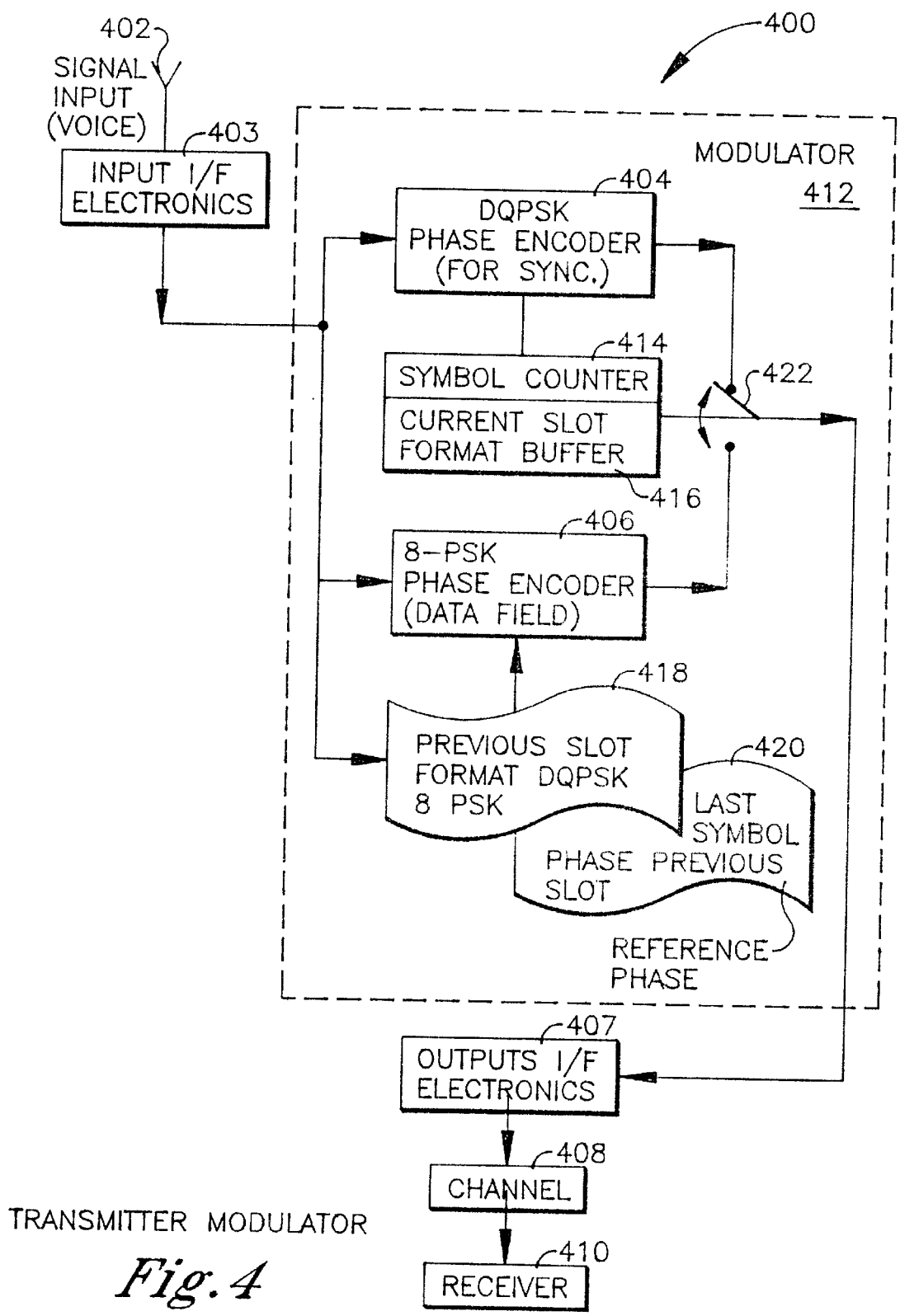
FIG. 4 is a block diagram of a transmitter utilizing a modulator which generates the slot format of FIG. 3.

An improved transmitter 400 as shown in FIG. 4 is used to transmit signals with slot formats 300 shown in FIG. 3. Improved transmitter 400 comprises: a Signal Input 402; Input Interface Electronics (Input I/F) 403; a Modulator 412 further comprising an Encoder Switch 422; a Differential-Quadrature-Phase-Shift-Keying (DQPSK) Encoder 404; an Eight (8) Phase-Shift-Keying (8-PSK) Encoder 406; a symbol counter 414; a current slot format buffer (and input) 416; a previous slot format and buffer (previous slot format) 418; a last symbol phase/previous slot and buffer (last sampled phase of previous slot) 420; an Output Interface Electronics (Output I/F) 407; a channel 408; and a receiver 100", 410.

The Signal Input 402 is coupled at an output to the Input I/F 403 (See FIG. 1 for an example of interface electronics in a conventional TDMA transmitter) which is coupled at an output to the Modulator 412.

The Modulator 412 further comprises the DQPSK Encoder 404, the Encoder Switch 422 and the 8-PSK Phase Encoder 406 in configuration to receive slots 300 from the Input Interface Electronics 403 to each of the DQPSK Encoder 404 and the 8-PSK Phase Encoder 406 and to switchably send slots 300 from each of the encoders 404, 406 to the Output Interface Electronics 407.

The Encoder Switch 422 is coupled to the Symbol Counter 414 and to the current slot format buffer 416 so as to signal the Encoder Switch 422 to switchably couple one of the DQPSK Encoder 404 or the 8-PSK Phase Encoder 406 to the Output Interface Electronics 407 depending on a status of a current slot format buffer (or input) 416 and the Symbol Counter 414 as described in detail later herein.

The previous slot format buffer 418 and last symbol phase buffer 420 are also coupled at their outputs to both the DQPSK Phase Encoder 404 and the 8-PSK Phase Encoder 406 to enable encoding as follows.

The modulator 412 is switchably coupled through an output of the Encoder Switch 422 to the output I/F 407 (see FIG. 1 for example) which transmits slots 300 to the channel 408. The channel sends slots 300 to the receiver 100", 410.

The Modulator 412 determines the amount of rotation by which a slot 300 must be pre-rotated in order to compensate for inherent phase offsets between the SYNC 202 and the new data field 306 in the slot 300. In order to determine this amount and to perform the pre-rotation, the Modulator 412 passes the slot 300 to the DQPSK Encoder 404 to encode (by phase rotation) the SYNC 202 sequence in a manner to be described herein (depending upon a reference 420 phase of a predetermined reference symbol of a prior slot 418) and also passes the slot 300 to the 8-PSK Encoder 406 to encode the new data field 306 in a manner to be described later herein (also depending upon the reference phase 420 of a predetermined reference symbol of a prior slot 418).

The slot 300 is therefore phase encoded by the Modulator, 412 before being passed to the channel 408.

Thus, the improved transmitter 400 pre-rotates the slots 300 before transmission according to a particular protocol which results in phase rotating both the SYNC 302 symbols and the new data field 306, such that they have the same respective reference phase 420. The Modulator 412 first determines wether the previous slot 418 is in the IS-136 Rev. A format (corresponding to $$\frac{\pi}{4}$$

-shifted DQPSK modulation) or whether the previous slot 418 is in the IS-136+ format (corresponding to 8-PSK modulation).

Once the Modulator 412 determines the modulation technique applied to the prior slot 418, the Modulator 412 will modulate the slot 300.

In one embodiment of the invention, if the prior slot 418 is in the IS-136 Rev. A format, the DQPSK phase encoder 404 differentially encodes the SYNC sequence 302 of FIG. 3. Differential encoding of the SYNC sequence 302 is specified in a IS-136 Rev. A Manual entitled "TIA/EIA INTERIM STANDARD TDMA Cellular/PCS-Ratio Interface-Mobile Station-Base Station Compatibility-Traffic Channels and FSK Control Channel, TIA/EIA/IS-136.2-A, October 1996", (hereinafter, "Interim Standard"). The Interim Standard became an ANSI Standard, ANSI-13-136 Rev. 0, and is incorporated herein by reference.

Next, all the bits in the slot 300 except for the SYNC 302 bits, which comprises the new data field 306 (without the REF 204), are phase-mapped according to a new phase rotation relation table shown in Table 1 below.

TABLE 1

Phase Rotation Relation Table for the Transmission of IS-136+ Slot

| Phase of the symbol 162 (last symbol) of the previous slot | Additional rotation amount |
| --- | --- |
| $\frac{\pi}{4}$ | 0 |
| $\frac{3\pi}{4}$ | $\frac{\pi}{2}$ |
| $\frac{-3\pi}{4}$ or $\frac{5\pi}{4}$ | $\pi$ |
| $\frac{-\pi}{4}$ or $\frac{7}{4}\pi$ | $\frac{-\pi}{2}$ or $\frac{3}{2}\pi$ |

After SYNC phase-mapping, an additional phase rotation for the new data field 306 is applied according to a reference phase 420 of a predetermined symbol of the prior slot 418 per Table 1 (Column 1). In the example of Table 1, the predetermined symbol is symbol 162, which is the last symbol of the previous slot used for the reference phase 420.

In another embodiment of the invention, if the prior slot 418 is in IS-136+ format, the 8-PSK phase encoder 406 does not apply an additional phase shift to the new data fields 306, however, the SYNC sequence 302 is differentially encoded by the DQPSK phase encoder 404. This is because it is assumed that the reference phase 420 for the differential encoding of the SYNC sequence 302 is $$\frac{\pi}{4}$$

and accordingly no (0) additional rotation is performed (see Table 1).

Additionally, the receiver 410 for demodulation of the (IS-136+) slot 300 always assumes that the SYNC 302 symbols are $$\frac{\pi}{4}$$

-shifted DQPSK-modulated with a phase of $$\frac{\pi}{4}.$$

Therefore, the reference phase 420, the last symbol phase in the previous slot is always assumed $$\frac{\pi}{4}.$$

The prior slot/s 418 using the $$\frac{\pi}{4}$$

-shifted DQPSK modulation could map the predetermined reference symbol for reference phase 420 (such as symbol 162) to phase values of $$\frac{\pm\pi}{4},$$

and $$\frac{\pm 3\pi}{4}.$$

Such modulation results in the SYNC 302 patterns conventionally encoded in absolute phase domain with four (4) different sequences with the following general relationship:

$$SYNC_j = (j-i)\frac{\pi}{2} SYNC_i, \quad i, j = 0, \ldots 3, \quad (1)$$

Where $SYNC_0$ is created from $$\frac{\pi}{4},$$

$SYNC_1$ created from $$\frac{3\pi}{4},$$

$SYNC_2$ from $$\left[\frac{-3\pi}{4}\right],$$

and 4 $SYNC_3$ from $$\left[\frac{-\pi}{4}\right].$$

In other words, $SYNC_j$, J=1, ..., 3 are simply phase rotated versions of $SYNC_0$ in an amount of phase rotation equal to $$\frac{j\pi}{2}.$$

Therefore, by simply rotating additionally the encoded phases of the data bits in the data field 306, by the same amount $$\frac{j\pi}{2},$$

the phase ambiguity, is eliminated. This results in all modulated signals in a given slot having the same reference phase shift.

Since the receiver 410 cannot identify or differentiate between different sources of phase shift on a received signal, the phase shift caused by the channel 408 alone is treated as though the same amount of phase shift is introduced by the transmitter 100', 400 on an ideal channel, wherein there is no degraded phase shift by the channel 408.

In one embodiment, the SYNC 302 symbols are differentially encoded relative to the last symbol of the previous (IS-136 Rev. A) slot (symbol 162) which can take on one of four phase values $$\left(\frac{\pm\pi}{4}, \frac{\pm 3\pi}{4}\right).$$

Thus, there are four different possible SYNC 302 sequences total in an absolute phase domain for a particular slot 300. Each version of the SYNC 302 sequences are phase rotated versions as described above depending upon reference phase 420, the last symbol phase of the previous slot (e.g., symbol 162). Alternatively, other predetermined reference symbol may be used in other embodiments.

By pre-rotating the phases of the new data field 306 by the amount of the SYNC 302 the new data field's 306 demodulation performance is improved by eliminating the need to correctly demodulate the REF symbol 204, and also data bandwidth is improved by adding three (3) extra bits to any field of choice.

Alternatively, a skilled artisan in the field will recognize that any group of phase rotation values (such as shown on the right-hand column of Table 1) which differ sequentially from each next one of the group by an amount equal to can be used to map additional phase rotations to data fields by adding an additional fixed amount delta Δ, to all the values in the right-hand column of Table 1, and specifying the SYNC symbols for IS-136+ slot are $$\frac{\pi}{4}$$

-shifted DQPSK-modulated with phase reference of $$\frac{\pi}{4} + \Delta,$$

where delta Δ is any arbitrary amount.

For example, instead of mapping the reference phase 400

$$\frac{\pi}{4}$$

to 0 it can be mapped to any phase angle desirable such as $$\frac{\pi}{4}$$

or $$\frac{-\pi}{4},$$

as long as all other mappings have the some offset, i.e., if a value $$\frac{\pi}{4}$$

is mapped to $$\frac{\pi}{4},$$

then $$\frac{3}{4}\pi$$

value in a next row should be mapped to $$\frac{\pi}{2} + \frac{\pi}{4} = \frac{3}{4}\pi$$

and so forth. The reference phase for the SYNC 302 symbols for the IS-136+ slot is specified as $$\frac{\pi}{4} + \frac{\pi}{4} = \frac{\pi}{2}.$$

Several benefits result from the new encoding scheme for modulation and demodulation. Since the REF symbol 204 is no longer necessary, there is better utilization of bandwidth by using the three (3) extra freed bits previously used for the REF 202 for data transmission or control. Also, a receiver can perform better. Symbol decision error on the REF symbol 204 at the receiver. 410 can lead to an entire burst being lost since data demodulation will be based upon an incorrect phase reference. In the new encoding scheme, there is no reliance on interpreting -any symbol at the receiver 410. Compensation is performed up front at the transmitter 100', 400 by pre-rotating the phases.

Figure 5:
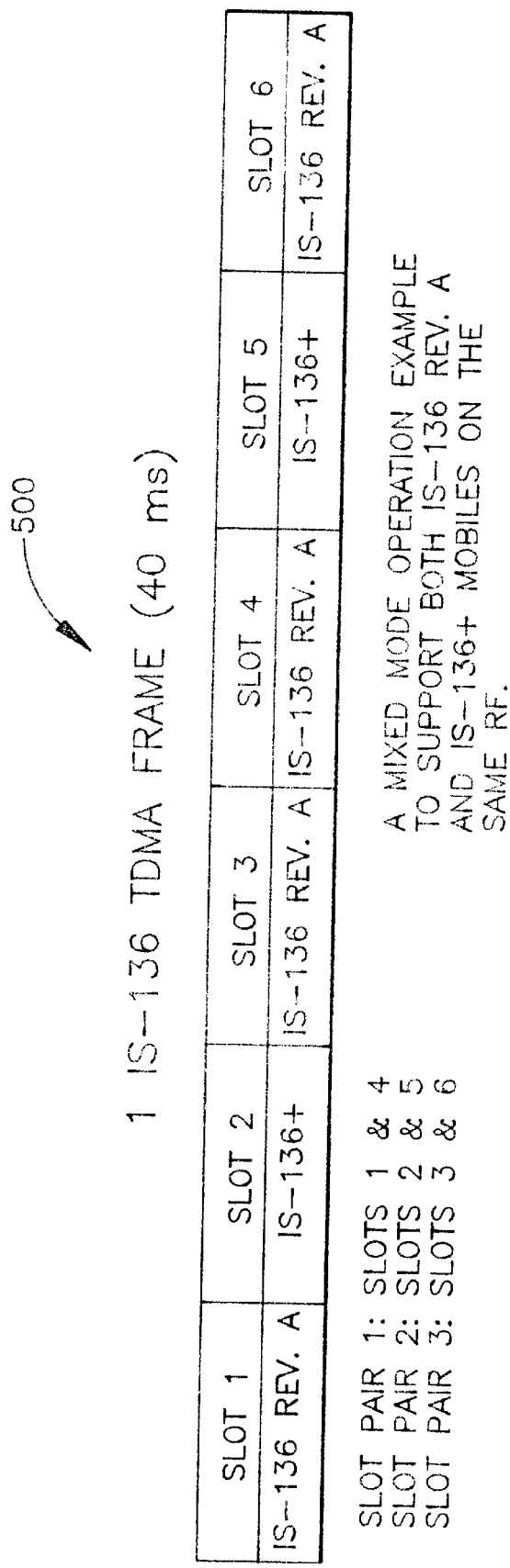
FIG. 5 is an illustration of a mixed mode operation which supports both IS-136 Rev. A and IS-136+ mobiles using the new slot format of FIG. 3.

Referring next to FIG. 5, an exemplary mixed mode IS-136 TDMA frame is shown wherein the apparatus and methods described above may be used to modulate and demodulate the mixed frame (mixed frame or mixed slot formation) 500. FIG. 5 comprises 6 slots 300. A slot 1 is in IS-136A format. A second slot 2 is in IS-136+ format followed by a third slot 3 in IS-136 Rev. A format. These 3 slots are followed by an analogous three slots comprising slot 4, slot 5 and slot 6 having the same pattern of slot format/s 300. Backward compatibility is achieved by determining a reference phase 420 of a predetermined reference symbol of a previous slot 418.

While the invention herein disclosed has been, describe by means of specific embodiments and applications thereof, numerous modifications and variations could be made thereto by those skilled in the art without departing from the scope of the invention set forth in the claims.

What is claimed is:

1. A method of modulation in a system for a mixed slot formation including differential and coherently encoded slots, the method including the steps of:

pre-phase encoding data and a predetermined sequence in a slot at a transmitter such that the encoded data and the predetermined sequence have equal reference phases from a reference symbol of a previous slot having a reference phase.

2. The method of claim 1 wherein the previous slot is in IS-136 Rev. A format.

3. A method of claim 2 further including:

pre-phase encoding the predetermined sequence with a phase determined from a reference symbol of the previous slot at the transmitter.

4. The method of claim 3 wherein the step of pre-phase encoding the data includes pre-phase encoding the data with another phase determined from a symbol 162 as the reference symbol.

5. The method of claim 4 wherein the other phase is determined by mapping the reference phase to a corresponding phase, the mapping comprising:

wherein mapping a phase of $$\frac{\pi}{4}$$

to phase 0;
   mapping a phase of $$\frac{3\pi}{4}$$

to phase $$\frac{\pi}{2};$$

mapping a phase of $\frac{-3\pi}{4}$ to phase $\pi$; and mapping a phase of $\frac{-\pi}{4}$ to phase $\frac{-\pi}{2}$.

6. The method of claim 4 wherein the other phase is determined by mapping the reference phase to a corresponding phase which is a multiple of $\frac{\pi}{2}$, the mapping comprising:

mapping a phase of $\frac{\pi}{4}$ to phase 0;

mapping a phase of $\frac{3\pi}{4}$ to phase $\frac{\pi}{2}$;

mapping a phase of $\frac{-3\pi}{4}$ to phase $\pi$; and mapping a phase of $\frac{-\pi}{4}$ to phase $\frac{-\pi}{2}$.

7. The method of claim 1 wherein the previous slot is in 8-Phase Shift Keying (8-PSK)(IS-136+) format.

8. The method of claim 7 further including:
differentially phase encoding the predetermined sequence according to the IS-136 Rev. A standards using a reference phase of $\frac{\pi}{4}$.

9. The method of claim 1 wherein pre-phase encoding data includes phase shifting data using one of a group of different phase angles, each of the different phase angles an integer multiple of $\frac{\pi}{2}$.

10. The method of claim 9 further including the step of:
pre-phase shifting the data by an additional phase angle θ, where $$\theta(j) = \frac{j\pi}{2},$$

where j is an integer representing a version of the predetermined sequence.

11. An IS-136 compatible transmitter comprising:
a differential encoder to differentially encode a SYNC pattern in a slot if a previous slot is in IS-136 Rev. A format; and
a phase-mapping encoder to phase-shift data bits by an amount determined by mapping a previous reference symbol to a multiple of $\frac{\pi}{2}$.

12. An IS-136 compatible transmitter comprising:
means for generating a plurality of slots with a slot format comprising:
a SYNC sequence, data bits and reserved bits;
a differential encoder to differentially encode a SYNC pattern in a slot if a previous slot is in IS-136 Rev. A format; and
a phase-mapping encoder to phase-shift data bits by an amount determined by mapping a previous reference symbol to a multiple of π/2.

* * * * *